Jan. 28, 1969  G. R. LOUTHAN  3,423,915

AUXILIARY STRIPPER FOR COMBINE

Filed Dec. 29, 1965

INVENTOR
GEORGE R. LOUTHAN
BY

United States Patent Office 3,423,915
Patented Jan. 28, 1969

3,423,915
AUXILIARY STRIPPER FOR COMBINE
George R. Louthan, Davenport, Iowa, assignor to J. I. Case Company, Racine, Wis., a corporation of Wisconsin
Filed Dec. 29, 1965, Ser. No. 517,325
U.S. Cl. 56—158            3 Claims
Int. Cl. A01d 43/06; B65g 33/08

ABSTRACT OF THE DISCLOSURE

A harvester trough with an auger rotatably mounted therein and with an opening extending in the trough. Crop strippers are disposed along the trough for preventing the crop from rotating around with the auger, and a stripper has an extension extending into the trough opening for having the crop moved into the central portion of the opening, rather than have the crop move into the opening at the near edge of the trough with respect to the movement of the crop along the trough.

---

Figure 1:
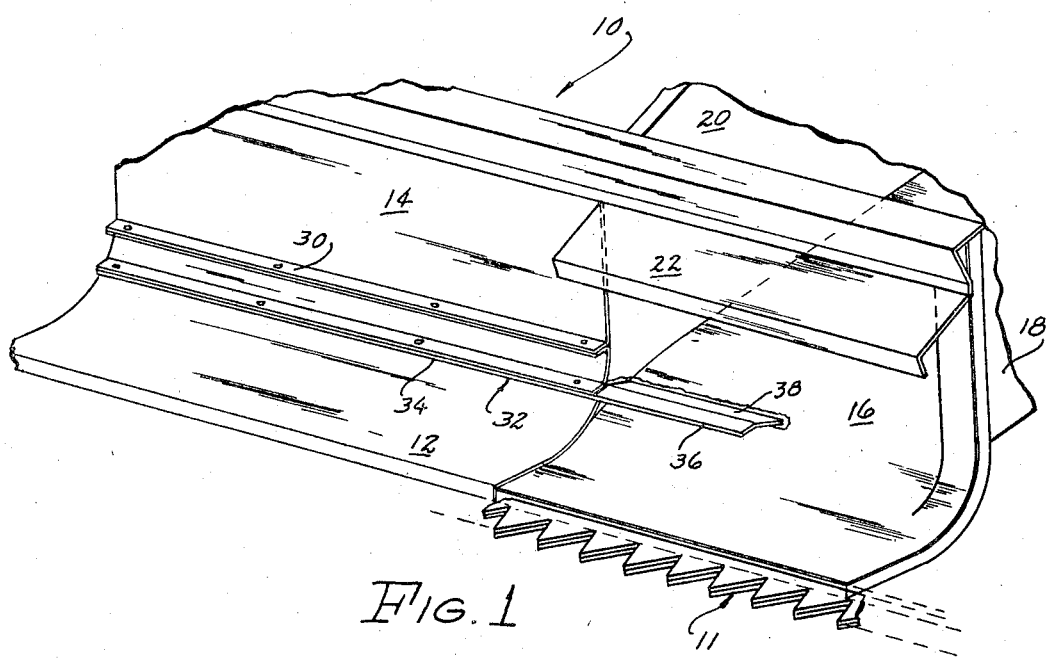

This invention relates to harvester headers and particularly to an auxiliary stripping means for the header auger. The header auger moves the unthreshed crop material from the cutter bar to a feed opening where a feed conveyor or feed rake carries the material to the threshing mechanism. The movement of crop material by the auger is generally facilitated by a stripping means; this means usually comprising a bar or an angular strip located on the rearward side of the auger trough and to one side of the feed opening, although larger machines may have a stripping means on each side of the feed opening. This stripping means has the function of stopping or preventing the unthreshed crop material from following the auger flighting, and thus building up on the auger. The stripper in conjunction with the auger flights forces the crop material axially along the trough for entrance into the feed opening.

Prior machines have had a retarder bar or a stripping means located rearwardly of the auger and normally attached to the auger trough. The stripper is constructed and designed to prevent the wrapping of the crop material around the auger, as stated above. A stripper bar usually comprises a flat bar or plate which juts outwardly from the trough and is positioned to have a nominal clearance of approximately 3/8 inch from the auger flights. Many conventional headers include a stripper bar which extends from the outer end of the trough to the feed opening.

In the smaller or pull-type combines, the feed opening is normally at one end of the header trough so that most of the crop material, as it is augered to the feed opening, enters the opening at the first opportunity to do so, or along one side of the opening. This bunching of material at one side of the opening has resulted in uneven feeding to the threshing cylinder, uneven sieve and rack loading, and a generally over-all lower efficiency of operation. The larger machines, as stated, may have a stripper bar on each side of a generally centrally located feed opening to provide for forced axial feeding by the auger to the feed rake from each side of the feed opening.

It has been found that with the advent of harvesting windrowed crops, and also due to increasing the intake and thru-put of crop material in a combine, that the increased volume of material became a problem in some present day machines due to the accumulation of material on one side of the threshing mechanism. The addition of an auxiliary or secondary stripping means facilitates moving of this increased volume of crop material to the feed opening without wrapping around the auger. An auxiliary stripper, positioned in the critical area of the trough, also conveys more of the material to the center or to the "starved" or lightly loaded section of the threshing mechanism. This is especially important when threshing windrowed material, mentioned above, as practically all of the material in the windrow occupies a relatively narrow space across the header. This invention is designed to provide an auxiliary stripping means located in the auger trough and positioned a certain distance across the feed opening to direct the crop material toward the center of the feed opening.

The main object of the invention is to provide an auxiliary stripping means for preventing crop material from wrapping around the header auger.

An additional object is to provide an auxiliary stripper for aiding the conveyance of crop material to the feed opening.

A further object is to provide an auxiliary stripper for moving the crop material toward the center of the feed opening, thus providing more even distribution of crop material to the threshing mechanism.

Figure 2:
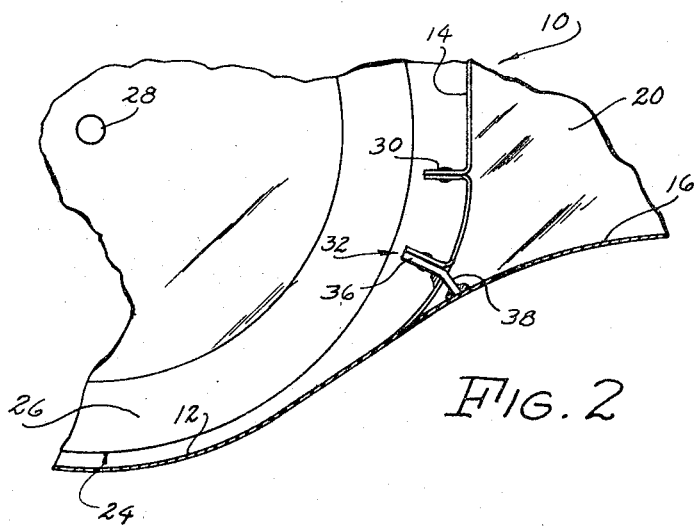

Additional objects and advantages will become apparent from a reading of the following specification and the annexed drawings, in which:

FIGURE 1 is a perspective view of the invention placed in a header trough, parts being removed; and FIGURE 2 is a side view of a header trough showing the invention.

In FIG. 1 is shown a perspective view of a header 10 for a combine, the reel and the auger being removed to show the location and construction of the present invention. The header is a part of the standard harvester-thresher machine and it is believed that the showing and description of the pertinent parts will suffice to understand the construction and operation of the invention.

A sickle 11 is carried on the forward part of the header and is actuated by well-known means which need not be described further. The header 10 includes a trough which has a lower portion 12 and a rear portion 14, these portions forming a semi-circular shaped material container, it being understood that the header also has side portions which enclose the auger and also contain the crop material. A feed opening 16 is located rearward, and preferably to one side, of the header trough. The larger machines, as mentioned, may have the feed opening nearer the center of the trough and the auger conveys the crop material from each side. Feed opening 16 has sides 18 and 20 which contain the crop material as it is being conveyed to the threshing mechanism. A top portion 22 is disposed above and to the rear of a part of the auger to keep the crop material in a position to be picked up by the feed rake and conveyed to the threshing cylinder.

An auger 24, of well-known type, is carried on shaft 28, as seen in FIG. 2, the auger also having flights 26. Shaft 28 extends across the width of the trough and is supported at the sides thereof and is driven by suitable means.

As stated above, when harvesting windrowed crop material, the bulk of the material is in an area which covers only a portion of the header width, and therefore the auger must convey that material, which is not directly in front of the feed opening, along the trough and toward the feed opening. To facilitate the movement of crop material to the feed opening, a regular or main stripper bar 30 is placed rearwardly of the auger and as the auger rotates, the stripper prevents the crop material from following the auger flighting. This is so because of the nominal clearance between the auger flighting and the stripper bar and the material is thus forced axially along the auger toward the feed opening. When a great volume of material is picked up from the windrow, and conveyed along the trough, the material will enter the feed opening at the first opportunity to do so and this is usually on one side nearest the auger.

To overcome the problem of uneven feeding to the threshing cylinder, and to more evenly distribute the material into the feed opening, an auxiliary stripping means or member 32 is disposed downwardly from the main stripper. Member 32 includes an end portion 34 and an end portion 36. Portion 34 is similar to the regular stripper 30 in construction and extent in the auger trough. However, portion 36 is an extension of portion 34 along the auger trough and extends for a predetermined distance across the feed opening 16, as seen in FIG. 1. It is thus seen that stripper 30 and portion 34 of member 32 aid in conveying the crop material from the outer end of the trough and prevent the material from wrapping around the auger. Portion 36 of the auxiliary stripper 32 also helps to prevent the material from following the auger flights along a portion of the feed opening and aids in moving the material to the center or to the starved area of the feed opening.

As seen in FIG. 2, the auxiliary stripper 32 is shown as a bar or rail extending in a generally horizontal plane and is positioned downwardly from shaft 28. Portion 36 is secured, as by welding, to the rear of the auger trough. The stripping member or stripper 30 and portion 34 of stripper 32 are shown as being made up of the mating parts of the rear portions of the trough. Portion 36 includes a portion 38 which is secured to the rear of the auger trough and thus helps support auxiliary stripper 32.

It is thus seen that herein described is an auxiliary stripping means or device which aids in conveying the crop material to the feed opening 16 and directs the material into position for a more even distribution into the threshing mechanism. While only one embodiment has been shown, it should be known to those skilled in the art that the length of the portion 36 of the auxiliary stripper 32 can be varied to obtain the most even feeding and efficient operation. It has been found that the best results were obtained when portion 36 extended to a point near the center of the feed opening. It is to be understood that other variations in the construction and details will doubtless occur to those skilled in the art; for example, the auxiliary stripper may be moved around the auger through a minimal distance and it may be secured by other means.

What is claimed as new and desired to be secured by Letters Patent of the United States is:

1. In a harvester, a crop carrying trough including a lower portion disposed substantially horizontally and a rearward portion extending from said lower portion in substantially an upright direction, said lower portion extending beyond one end of said rearward portion and defining a crop-feed opening at the extending end of said lower portion, an auger rotatably disposed in said trough and extending therealong for conveying crop material to said feed opening, a first stripping means affixed to and extending along said trough for assisting said auger in moving the crop toward said crop-feed opening, the improvement comprising an auxiliary stripping means being located substantially along the line of demarcation between said lower portion and said rearward portion of said trough, below and substantially parallel to said first stripping means, and including an extending portion projecting into said crop-feed opening substantially to the center thereof and being affixed to and in full contact with said lower portion in the extent into said crop-feed opening for assisting said auger in moving the crop to said center of said crop-feed opening.

2. The subject matter of claim 1, wherein said first stripping means affixed to said trough terminates adjacent said crop feed opening.

3. The subject matter of claim 1, wherein said extending portion of said auxiliary stripping means is welded to said lower portion of said trough throughout the extent of said extending portion into said opening for preventing the crop from moving between said extending portion and said lower portion.

References Cited

UNITED STATES PATENTS

| | | | |
|---|---|---|---|
| 1,806,928 | 5/1931 | Bartels | 56—20 X |
| 1,959,689 | 5/1934 | Ronning | 56—20 |
| 2,155,422 | 4/1939 | Korsmo et al. | 198—104 |
| 2,426,922 | 9/1947 | Carroll | 56—158 |
| 2,755,912 | 7/1956 | Ashton | 198—104 |

LUCIE H. LAUDENSLAGER, *Primary Examiner.*

U.S. Cl. X.R.

198—104